(12) United States Patent
Kuwahara et al.

(10) Patent No.: US 7,451,031 B2
(45) Date of Patent: Nov. 11, 2008

(54) CONTROL UNIT AND METHOD FOR VEHICLE

(75) Inventors: Seiji Kuwahara, Toyota (JP); Masato Kaigawa, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 79 days.

(21) Appl. No.: 11/652,018

(22) Filed: Jan. 11, 2007

(65) Prior Publication Data

US 2007/0191184 A1    Aug. 16, 2007

(30) Foreign Application Priority Data

Jan. 13, 2006    (JP)    ............... 2006-006017

(51) Int. Cl.
    *G06F 7/00*    (2006.01)
(52) U.S. Cl. .............................. 701/51; 701/54; 701/58
(58) Field of Classification Search ............... 701/22, 701/51, 54, 55, 58, 60, 61, 64; 477/107, 477/109
    See application file for complete search history.

(56) References Cited

U.S. PATENT DOCUMENTS

| 6,459,979 | B2 | 10/2002 | Murakami | |
| 6,551,208 | B1 * | 4/2003 | Holmes et al. | ................. 475/5 |
| 7,228,926 | B2 * | 6/2007 | Takami et al. | ............... 180/65.2 |
| 7,282,011 | B2 * | 10/2007 | Tabata et al. | ................. 477/109 |
| 2005/0192154 | A1 | 9/2005 | Sakamoto et al. | |

FOREIGN PATENT DOCUMENTS

| DE | 601 21 391 T2 | 11/2006 |
| JP | 2001-347854 A | 12/2001 |
| JP | 2005-248728 A | 9/2005 |

* cited by examiner

*Primary Examiner*—Richard M. Camby
(74) *Attorney, Agent, or Firm*—Sughrue Mion, PLLC (57) ABSTRACT

An ECT_ECU performs a program including: a step of determining whether the gears are being changed or the gears are not being changed; a step of setting the virtual gear to the current gear, if the gears are not being changed; a step of setting the virtual gear to the gear before the gears are changed, if the gears are being changed but the inertia phase has not been started; a step of setting the virtual gear to the gear after the gears are changed, if the gears are being changed and the inertia phase has been started; a step of calculating the gear-change progress α; a step of calculating the virtual gear ratio based on the virtual gear and the gear-change progress α; and a step of calculating the target engine torque using the virtual gear ratio.

10 Claims, 6 Drawing Sheets

| | C1 | C2 | C3 | C4 | B1 | B2 | B3 | B4 | F0 | F1 | F2 | F3 |
|---|---|---|---|---|---|---|---|---|---|---|---|---|
| P | ○ | | | | | | | | | | | |
| R | ○ | | ○ | | ◎ | | | ○ | | ○ | | |
| N | ○ | | | | | | | | | | | |
| 1st | ○ | | | ◎ | | | ○ | ◎ | ○ | | | ○ |
| 2nd | ○ | ○ | | ◎ | ◎ | ◎ | △ | | ○ | ○ | ○ | |
| 3rd | ○ | ○ | △ | ◎ | | | △ | | ○ | ○ | | |
| 4th | ○ | ○ | ○ | ◎ | | | △ | | ○ | | | |
| 5th | △ | ○ | | | ○ | | △ | | | | | |
| 6th | △ | ○ | | | △ | ○ | △ | | | | | |

⇨ UP-SHIFT (ONE-WAY CLUTCH IDLING)
⇨ UP-SHIFT (CLUTCH TO CLUTCH)

FIG.4

⇨ INERTIA PHASE IS STARTED

FIG.5

CONTROL UNIT AND METHOD FOR VEHICLE

INCORPORATION BY REFERENCE

The disclosure of Japanese Patent Application No. 2006-006017 filed on Jan. 13, 2006 including the specification, drawings and abstract is incorporated herein by reference in its entirety.

BACKGROUND OF THE INVENTION

1. Field of the Invention

The invention relates generally to a control unit and method for a vehicle equipped with a stepped automatic transmission. More specifically, the invention relates to such control unit and method that prevents shift shock from being caused during drive power demand control.

2. Description of the Related Art

A control technique called "drive power control" is often employed in a vehicle equipped with an automatic transmission and an engine which is controllable to output a required torque independently of an accelerator pedal operation performed by a driver. According to the drive power control, a positive or negative target drive power is calculated based on the amount by which the accelerator pedal is operated by the driver, the operating conditions of the vehicle, and the like. Based on the calculated target drive power, the engine torque and the gear ratio of the automatic transmission are controlled. Examples of the drive power control include "drive power demand control" and "torque demand control".

In this drive power control, the target drive power for the vehicle is calculated based on the vehicle speed and the accelerator pedal operation performed by the driver. Then, the gears (gear ratio) and the engine torque are controlled to achieve the target drive power. The engine torque is set using a map indicating the throttle valve opening amount required for outputting the target drive power set for each gear. When the gears are changed, the time, at which the gears are actually changed (the time at which gear-change is actually started), and the time, at which the throttle valve opening amount is changed, are controlled to be synchronized with each other. In this case, responses of the transmission and the throttle valve to the controls are taken into account. Thus, shift shock is reduced.

Japanese Patent Application Publication No. 2001-347854 (JP-A-2001-347854) describes a drive power control unit for a vehicle equipped with a stepped automatic transmission, which reduces shift shock. This drive power control unit includes first means for calculating the target drive power; second means for calculating the target engine torque based on the target drive power and the gear ratio; and third means for performing control so that the gear ratio of the current gear is used to calculate the target engine torque when the gears are not being changed, and the actual gear ratio, calculated based on the rotational speeds of the input shaft and the output shaft of the transmission, is used to calculate the target engine torque while the gears are being changed.

The drive power control unit performs such control when the gear ratio is changed. Accordingly, with this drive power control unit, the target engine torque is gradually changed based on the actual gear ratio while the gears are being changed. As a result, it is possible to prevent sudden reduction in torque, and thereby to reduce shift shock. However, if the actual gear ratio calculated based on the rotational speeds of the input shaft and the output shaft of the transmission is used, shift shock may be increased by sudden increases in the engine torque due to changes in the calculated value of the actual gear ratio. Such changes occur due to a malfunction in a sensor or disengagement of a one-way clutch. However, the drive power control unit described above uses the actual gear ratio only while the gears are being changed, and the gear ratio of the current gear is used when the gears are not being changed. Therefore, it is possible to prevent increases in shock given to the vehicle. While the gears are being changed, friction elements of the transmission are slipping. Accordingly, even if the engine torque is suddenly increased, the increase in the engine torque is not entirely reflected on the torque output from the transmission. For example, only the torque within the capacity of a clutch, one of the friction elements, is transferred, and the remaining torque just contributes to increases in slippage of the clutch. Accordingly, although shock is temporarily caused, such shock is absorbed in the slippage of the clutch. Moreover, even while the gears are being changed, until the gear ratio starts changing due to start of the inertia phase, the gear ratio of the gear is used instead of the actual gear ratio. With such control, the target engine torque is not changed at the initial stage of the inertia phase, but is changed after the gear-change has proceeded to a certain degree in the inertia phase. Thus, it is possible to prevent increases in shift shock, delay in a change in the target engine torque, and the like.

The drive power control unit described above calculates the torque to be output from the internal combustion engine, using the gear ratio of the current gear when the gears are not being changed, and using the actual gear ratio calculated based on the rotational speeds of the input shaft and the output shaft of the transmission (=rotational speed of input shaft of transmission (rotational speed of turbine)/rotational speed of output shaft of transmission) while the gears are being changed.

Usually, a transmission is provided with a one-way clutch that transmits drive power only in one direction. When the torque to be output from the engine is calculated in the above-described manner, if the one-way clutch is disengaged, the gear ratio of the gear deviates from the actual gear ratio. In such a state, if the gear ratio used to calculate the target engine torque is changed, the engine torque may suddenly changes, and, consequently, shock may be caused. If the engine torque is controlled using the actual gear ratio while the gears are being changed, the engine torque may not be performed stably if the rotational speeds fluctuate or the detection accuracy of the sensor is not sufficiently high.

However, in the control of the torque output from the engine, which is the drive power source of the vehicle, described in Japanese Patent Application Publication No. 2001-347854 (JP-A-2001-347854), such inconveniences are not taken into account.

SUMMARY OF THE INVENTION

The invention provides a control unit and method for a vehicle equipped with a stepped automatic transmission, which accurately calculates the target torque required to be output from a drive power source of the vehicle while the gears are being changed, thereby reducing shift shock due to fluctuation in torque from the drive power source.

A first aspect of the invention relates to a control unit for a vehicle equipped with a stepped automatic transmission. The control unit includes a gear-change progress calculation device that calculates progress of gear-change performed by the automatic transmission; a virtual gear ratio calculation device that calculates a virtual gear ratio based on the progress of the gear-change, the gear ratio before the gear-change and the gear ratio after the gear-change; and a target torque calculation device that calculates a target torque to be output from a drive power source of the vehicle based on the virtual gear ratio.

The control unit according to the first aspect of the invention calculates, as the gear-change progress, the degree to which the gear-change has proceeded in the inertia phase, and calculates the virtual gear ratio so that the virtual gear ratio corresponds to the gear-change progress. Thus, if the gear-change progress is little, a virtual gear ratio, on which the gear ratio before the gears are changed is reflected more greatly than the gear ratio after the gears are changed, is obtained. On the other hand, if the gear-change progress is large, a virtual gear ratio, on which the gear ratio after the gears are changed is reflected more greatly than the gear ratio before the gears are changed, is obtained. In this manner, the target torque is calculated based on the continuous virtual gear ratio in the inertia phase, which is calculated by interpolating a value between the gear ratio before the gears are changed and the gear ratio after the gears are changed. Accordingly, it is possible to change the target torque continuously. Thus, it is possible to absorb shock caused by fluctuation in the torque output from the drive power source of the vehicle. Especially, because continuous virtual gear ratio is used, it is possible to change the target torque continuously even when a one-way clutch is idling. As a result, in the vehicle equipped with a stepped automatic transmission, it is possible to accurately calculate the target torque required to be output from the drive power source of the vehicle while the gears are being changed, whereby shift shock caused by torque fluctuation is suppressed.

A second aspect of the invention relates to a control method for a vehicle equipped with a stepped automatic transmission. According to the control method, progress of gear-change performed by the automatic transmission is calculated, a virtual gear ratio is calculated based on the progress of the gear-change, the gear ratio before the gear-change and the gear ratio after the gear-change; and a target torque to be output from a drive power source of the vehicle is calculated based on the virtual gear ratio.

BRIEF DESCRIPTION OF THE DRAWINGS

The foregoing and further objects, features and advantages of the invention will become apparent from the following description of an example embodiment with reference to the accompanying drawings, wherein the same or corresponding portions are denoted by the same reference numerals and wherein.

DETAILED DESCRIPTION OF THE EXAMPLE EMBODIMENT

Hereinafter, an embodiment of the invention will be described in detail with reference to accompanying drawings. In the following description, the same or corresponding portions will be denoted by the same reference numerals. Names and functions thereof are also identical to each other, and therefore, redundant explanation thereof will be omitted.

A power train of a vehicle including a control unit according to the embodiment will be described. The control unit according to the embodiment of the invention is an electronic control unit (ECU) 1000 shown in FIG. 1. In the embodiment, an automatic transmission is provided with a torque converter, and includes a planetary gear speed reduction mechanism, and the vehicle is equipped with an engine that serves as a drive power source of the vehicle.

Figure 1:
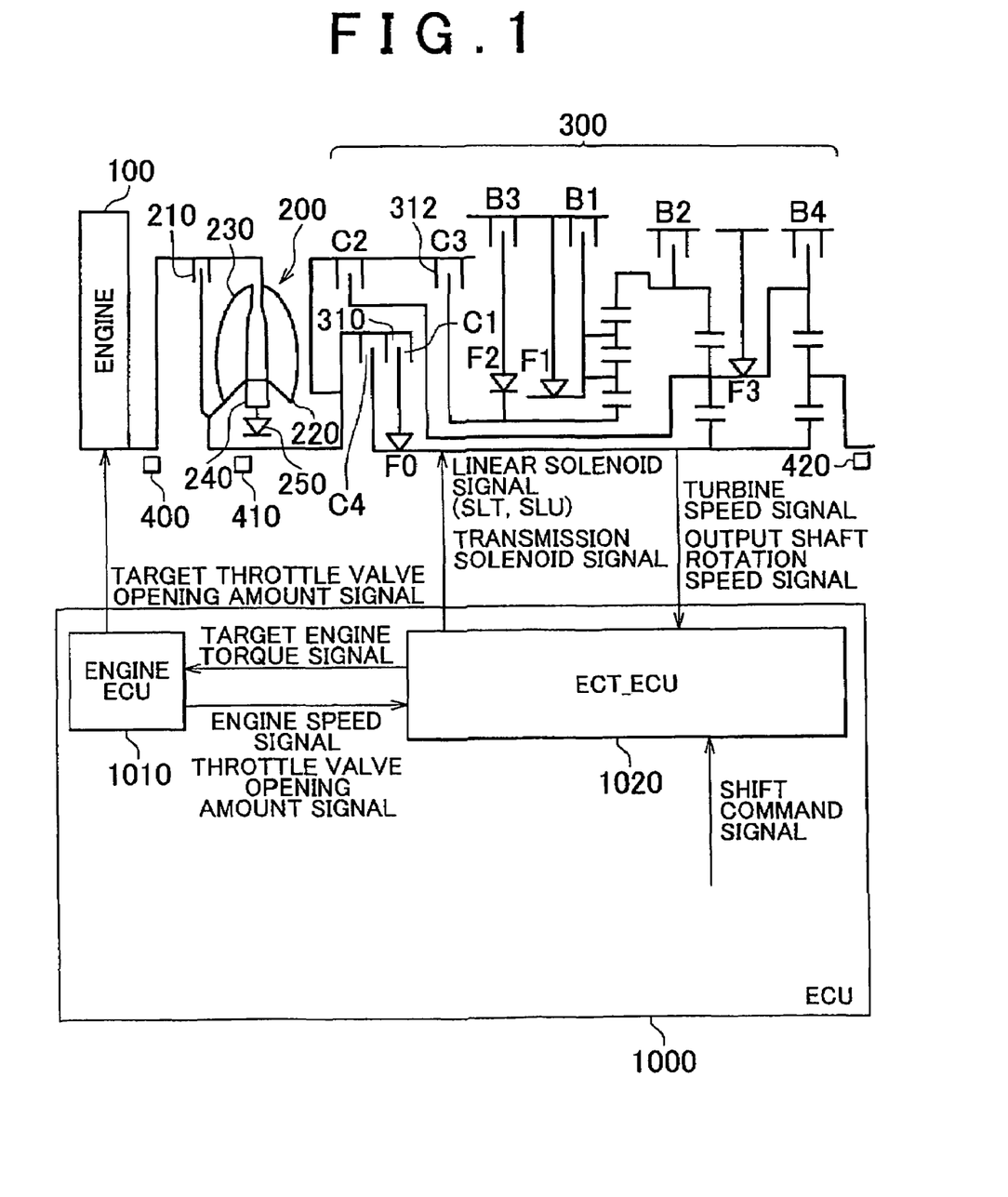
FIG. 1 is the control block diagram of an automatic transmission according to an embodiment of the invention.

As shown in FIG. 1, the power train of the vehicle includes an engine 100, a torque converter 200, an automatic transmission 300, and the ECU 1000. The output shaft of the engine 100 is connected to the input shaft of the torque converter 200. The engine 100 and the torque converter 200 are connected to each other by a rotating shaft. Accordingly, the output shaft rotational speed NE (engine speed NE) of the engine 100, which is detected by an engine speed sensor 400, and the rotational speed of the input shaft of the torque converter 200 (rotational speed of a pump impeller) are identical to each other.

The torque converter 200 includes a lock-up clutch 210 that directly couples the input shaft of the torque converter 200 with the output shaft of the torque converter 200, a pump impeller 220 arranged on the input shaft side, a turbine runner 230 arranged on the output shaft side, and a stator 240 which is provided with a one-way clutch 250 and which has a torque-amplifying function. The torque converter 200 and the automatic transmission 300 are connected to each other by a rotating shaft. The output shaft rotational speed NT (turbine speed NT=input shaft rotational speed NIN of the automatic transmission 300) of the torque converter 200 is detected by a turbine speed sensor 410. The output shaft rotational speed NOUT of the automatic transmission 300 is detected by an output shaft rotational speed sensor 420.

Figure 2:
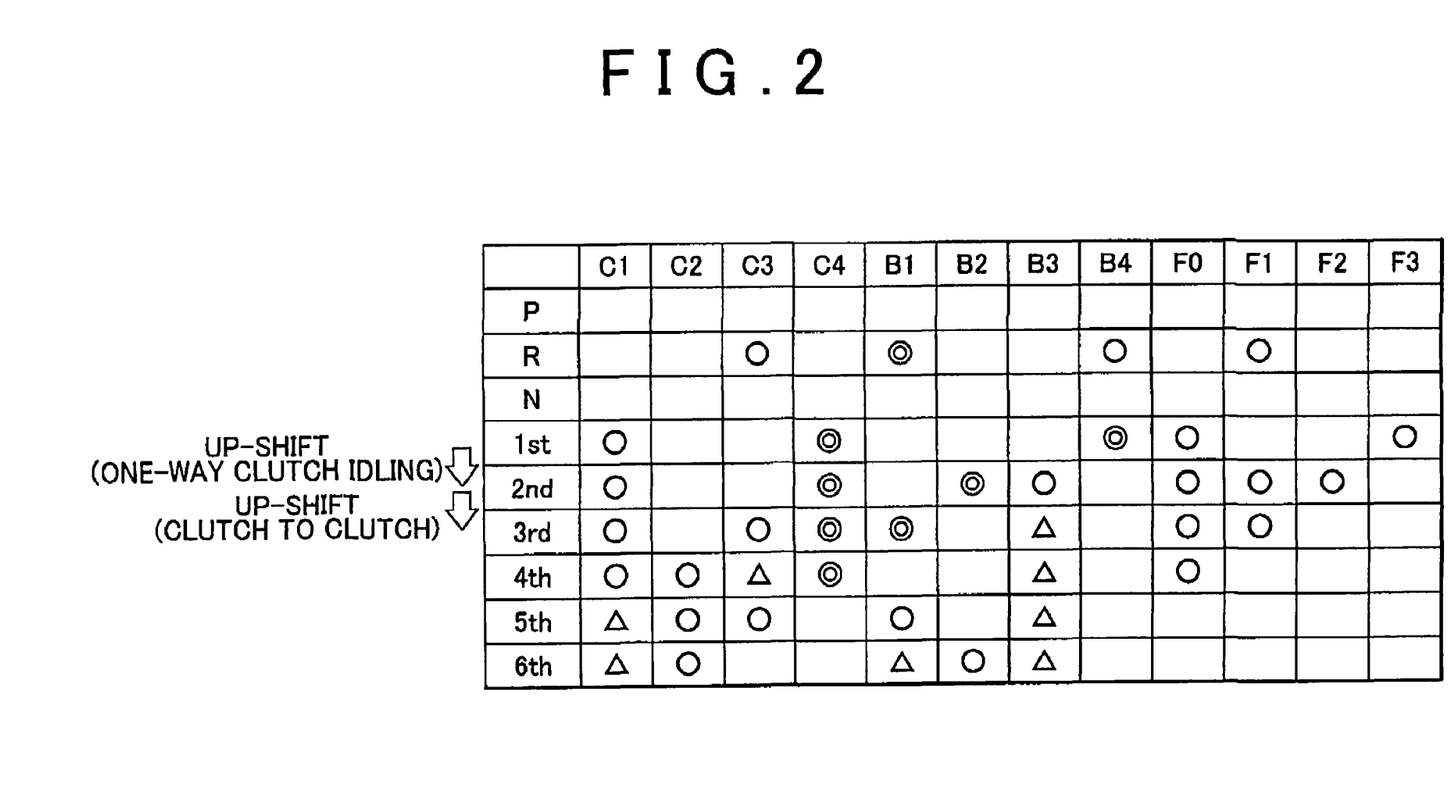
FIG. 2 is the operation chart of the automatic transmission shown in FIG. 1.

FIG. 2 shows the operation chart of the automatic transmission 300. The operation chart in FIG. 2 shows the relationship between each gear and the operational states (whether the friction elements are engaged/applied or disengaged/released at each gear) of friction elements, i.e., clutches (C1 to C4 in FIG. 2), brakes (B1 to B4), and one-way clutches (F0 to F3). At first gear, which is selected when the vehicle is started, the clutch C1 and the one-way clutches F0 and F3 are engaged. It should be noted that, in FIG. 2, a circle indicates that the clutch is engaged or the brake is applied; a double circle indicates that the clutch is engaged or the brake is applied when engine braking is applied; and a triangle indicates that, although the clutch is engaged or the brake is applied, such engagement/application has no influence on power transfer.

For example, clutch-to-clutch shift (up-shift) occurs when the automatic transmission 300 is shifted from second gear to third gear. A gear-change (up-shift) where the one-way clutch runs idle occurs when the automatic transmission 300 is shifted from first gear to second gear.

The ECU 1000 that controls the power train includes an engine ECU 1010 that controls the engine 100, and an electronic controlled automatic transmission (ECT)_ECU 1020 that controls the automatic transmission 300.

The ECT_ECU 1020 receives a signal indicating the turbine speed NT from the turbine speed sensor 410, and a signal indicating the output shaft rotational speed NOUT from the output shaft rotational speed sensor 420. The ECT_ECU 1020 receives, from the engine ECU 1010, a signal indicating the engine speed NE detected by the engine speed sensor 400, and a signal indicating the throttle valve opening amount detected by a throttle position sensor.

These rotational speed sensors are provided so as to face the teeth of the gears for detecting rotations, which are attached to the input shaft of the torque converter 200, the output shaft of the torque converter 200, and the output shaft of the automatic transmission 300, respectively. The rotational speed sensors are capable of detecting even slight rotations of the input shaft of the torque converter 200, the output shaft of the torque converter 200 and the output shaft of the automatic transmission 300. The rotational speed sensors are, for example, so-called semi-conductor sensors that include magnetic resistance elements.

Solenoid control signals are transmitted from the ECT_ECU 1020 to linear solenoid valves of the automatic transmission 300. According to the solenoid control signals, the clutches (C1 to C4), the brakes (B1 to B4), and the one-way clutches (F0 to F3) are engaged/applied or disengaged/released. For example, when the automatic transmission 300 is shifted from sixth gear to fifth gear, the engaging pressures are controlled so that the clutch C3 is engaged and the brake B2 is released. Actually, the ECT_ECU 1020 transmits the solenoid control signals to the linear solenoid valves in a hydraulic circuit. The ECT_ECU 1020 calculates the target hydraulic pressure (the hydraulic pressure at which the target engaging pressure is achieved), described later. The ECT-ECU 1020 calculates the hydraulic pressures to be applied to hydraulic servos based, for example, on the calculated target hydraulic pressure, and then transmits signals indicating the calculated hydraulic pressures to the solenoid valves.

The hydraulic circuit includes, for example, two linear solenoid valves, and a plurality of hydraulic servos that engage/apply and disengage/release multiple friction engaging elements (the clutches and the brakes) that change the power transfer path formed in a planetary gear unit of the automatic transmission 30, thereby selecting one gear from among six forward gears and one reverse gear. The input port of each of the linear solenoid valves is supplied with a solenoid modulator pressure. A control pressure from the output port of each of the linear solenoid valves is supplied to a control oil chamber of a pressure control valve. The input port of the pressure control valve is supplied with a line pressure, and a regulated pressure from the output port, which has been regulated by the controlled hydraulic pressure, is appropriately supplied to each of the hydraulic servos via a shift valve.

Such hydraulic circuit is merely one example. In fact, multiple hydraulic servos are provided so as to correspond to the number of gears of the automatic transmission, and also multiple shift valves that switch the hydraulic pressures to the hydraulic servos are provided. Each of the hydraulic servos has a piston that is oil-tightly fitted in a cylinder by an oil seal. The piston moves against a return spring, using the regulated hydraulic pressure from the pressure control valve, which is applied to a hydraulic pressure chamber, thereby bringing an outer friction plate into contact with an inner friction member. Such friction plate and the friction member are employed in not only the clutches but also the brakes.

The ECT_ECU 1020 detects the progress of the gear-change performed based on a shift command signal, and transmits a target engine torque signal to the engine ECU 1010. The engine ECU 1010 calculates the throttle valve opening amount at which the target torque is output from the engine 100, based on the target engine torque signal. The engine ECU 1010 then transmits a target throttle valve opening amount signal to an actuator (e.g. a stepping motor) for the throttle valve of the engine 100.

Figure 3A:
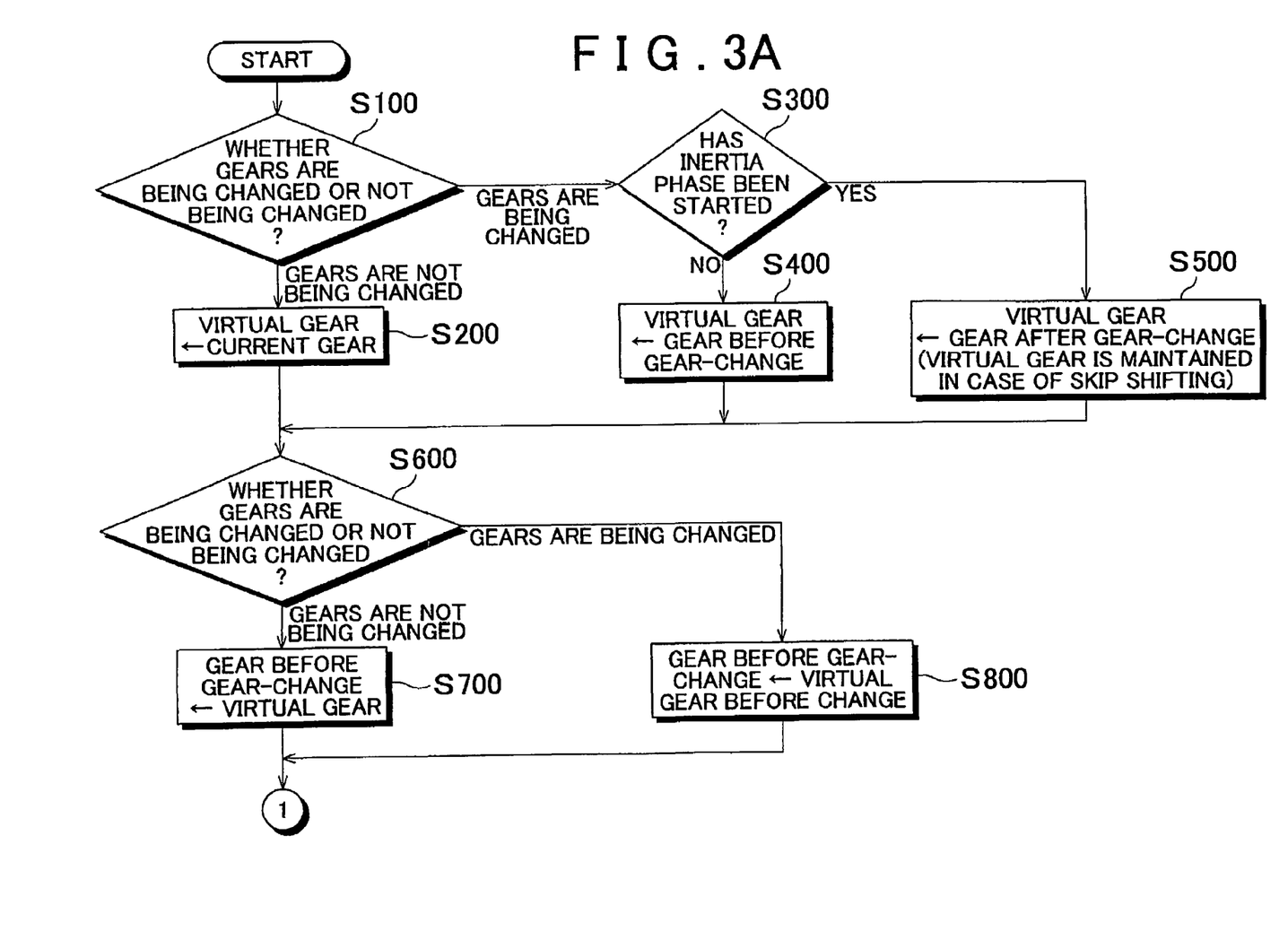
FIGS. 3A and 3B illustrate the flowchart showing the target engine torque calculation routine performed by an ECU.
Figure 3B:
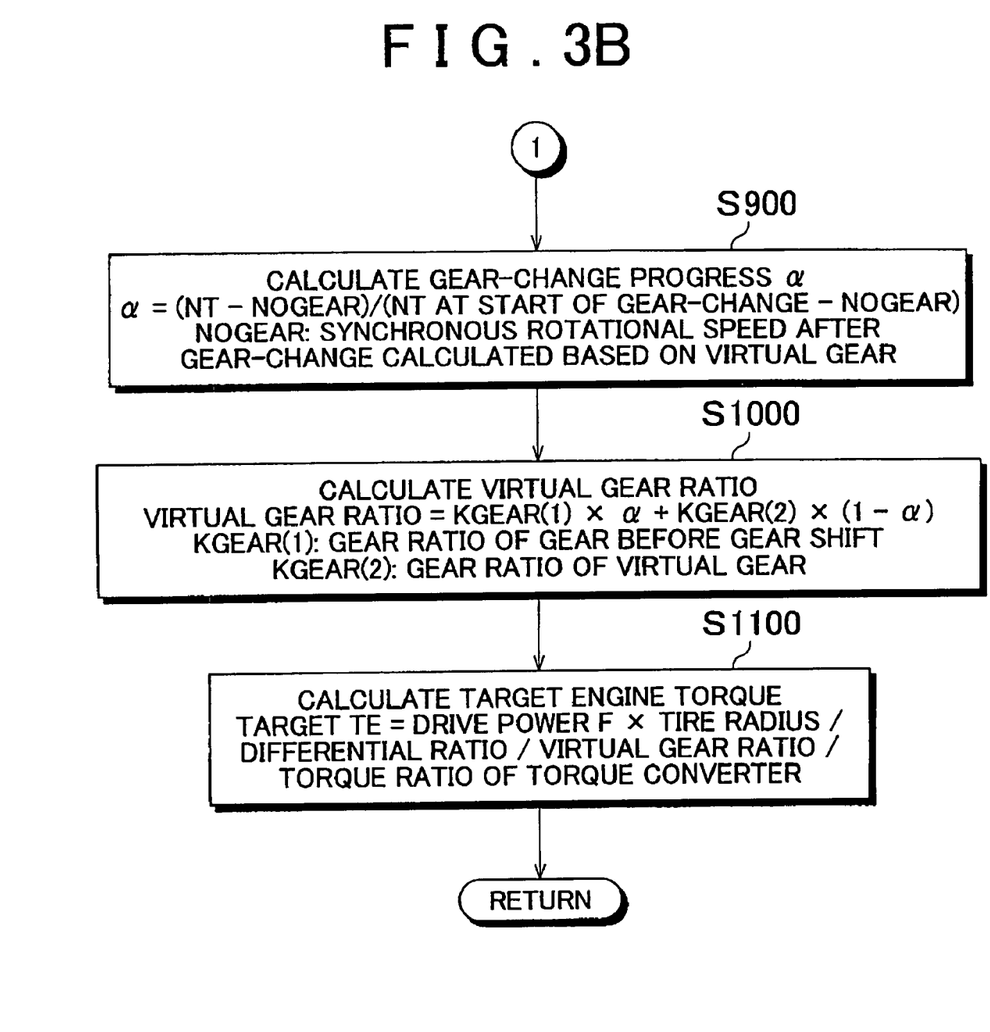

Next, with reference to FIG. 3, the control routine performed by the ECT_ECU 1020, which is included in the control unit according to the embodiment of the invention, will be described.

In step (hereinafter, "step" is simply referred to as "S") 100, the ECT_ECU 1020 determines whether the gears are being changed or the gears are not being changed. Such determination may be made based on a shift command signal received by the ECT_ECU 1020. Alternatively, such determination may be made using a shift diagram showing the shift pattern for the automatic transmission 300, based on the vehicle speed and the opening amount of the throttle valve of the engine 100. If it is determined in S100 that the gears are not being changed, the process goes to S200. On the other hand, if it is determined in S100 that the gears are being changed, the process goes to S300.

In S200, the ECT_ECU 1020 sets the virtual gear to the current gear.

In S300, the ECT_ECU 1020 determines whether the inertia phase has been started. This determination is made based on the rotational speed signal input in the ECT_ECU 1020. If it is determined that the inertia phase has not been started (NO in S300), the process goes to S400. If it is determined that the inertia phase has been started (YES in S300), the process goes to S500.

In S400, the ECT_ECU 1020 sets the virtual gear to the gear before the gears are changed.

In S500, the ECT_ECU 1020 sets the virtual gear to the gear after the gears are changed. However, in the case of skip shifting (i.e., in the case where a shift command is further generated during the shift control performed according to the preceding shift command), in the inertia phase of the gear-change that has started according to the preceding shift command (YES in S300), the current virtual gear is not changed, and is maintained until the inertia phase of the gear-change according to the subsequent shift command is started.

The virtual gear is determined by performing S100 to S500. Further, the gear before the gears are changed is determined by performing S600 to S800.

The ECT_ECU 1020 determines in S600 whether the gears are being changed or the gears are not being changed. If it is determined in S600 that the gears are not being changed, the process goes to S700. On the other hand, if it is determined in S600 that the gears are being changed, the process goes to S800.

In S700, the ECT_ECU 1020 sets the gear before the gears are changed to the virtual gear.

In S800, the ECT_ECU 1020 sets the gear before the gears are changed to the virtual gear.

In S900, the ECT_ECU 1020 calculates the gear-change progress $\alpha$. The gear-change progress $\alpha$ is calculated by the expression, $\alpha=(NT-NOGEAR)/(NT$ when gear-change is started$-NOGEAR)$. In the expression, NT represents the turbine speed, and NOGEAR represents the synchronous rotational speed after the gears are changed, which is calculated based on the virtual gear.

In S1000, the ECT_ECU 1020 calculates the virtual gear ratio. The virtual gear ratio is calculated by the expression, virtual gear ratio=KGEAR $(1)\times\alpha+$KGEAR $(2)\times(1-\alpha)$. In the expression, KGEAR (1) represents the gear ratio of the gear before the gears are changed, and KGEAR (2) represents the gear ratio calculated based on the virtual gear.

In S1100, the ECT_ECU 1020 calculates the target engine torque TE (that is also referred to as a "target TE"). The target engine torque TE is calculated by the expression, drive power F×tire radius/differential gear ratio/virtual gear ratio/torque ratio of the torque converter 200. By performing S1100, the target engine torque TE is calculated. The expression (conversion expression) for calculating the target TE is used regardless of whether the gears are being changed or the gears are not being changed.

Figure 4:
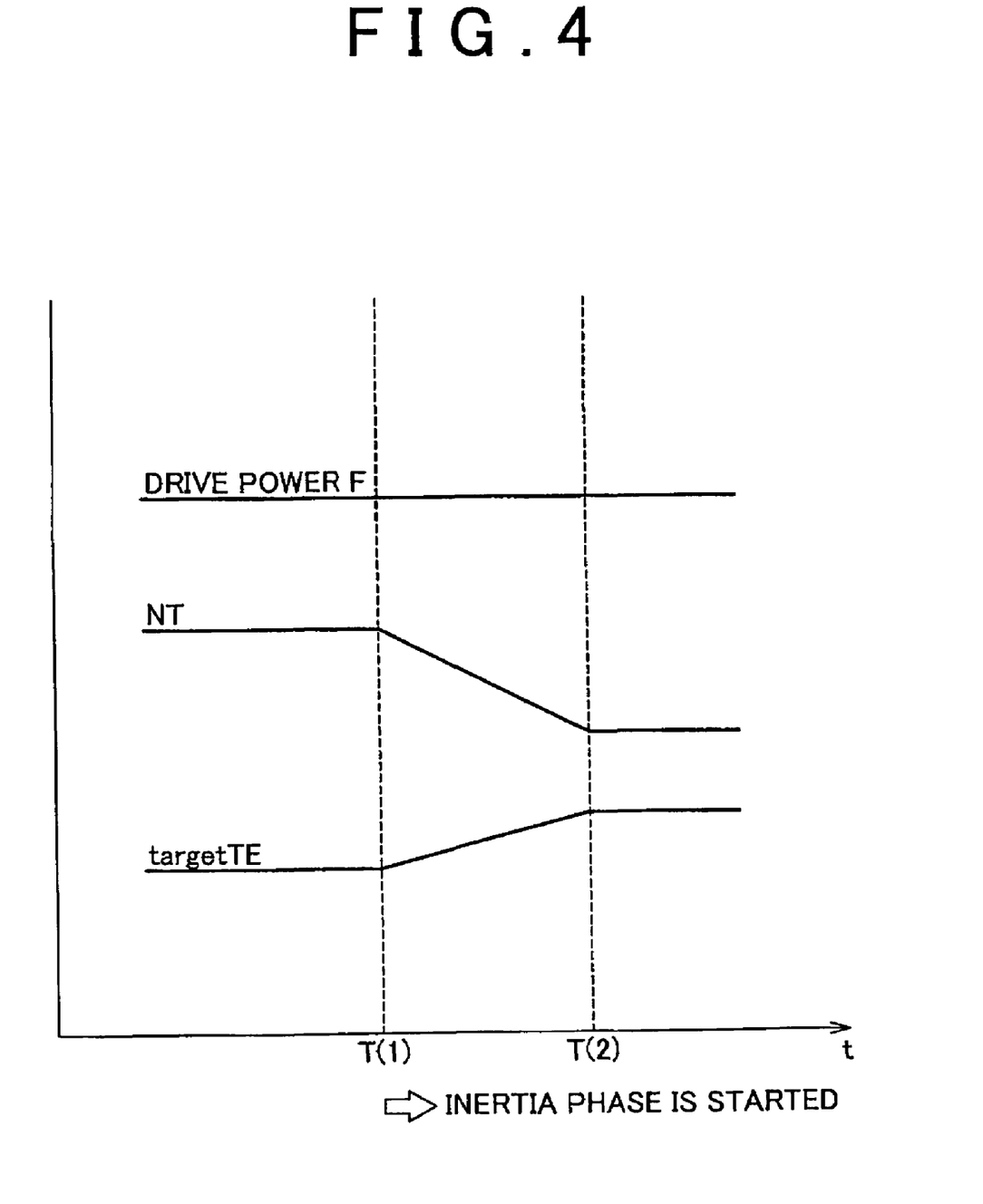
FIG. 4 illustrates the first timing chart showing the state when the routine shown in the flowchart in FIG. 3 is performed.

The control performed in the vehicle provided with the ECT_ECU 1020, which is included in the control unit according to the embodiment of the invention and which has the above-described structure and performs the control routine shown in the flowchart, will be described below. Because the control varies depending on the states of the automatic transmission 300, description on the control in each state will be provided. In the following description, the control performed during normal shifting (which is not skip shifting) will first be explained. FIG. 4 shows an example of the timing chart showing the state when the normal shifting is performed.

[When inertia phase has not been started in gear-change from second gear to third gear]

Because it is determined in S100 that the gears are being changed, and it is also determined in S300 that the inertia phase has not been started (the torque phase before time T(1) in FIG. 4), the virtual gear is set, in S400, to second gear which is the gear before the gears are changed. Further, because it is determined in S600 that the gears are being changed, the gear before the gears are changed is set, in S800, to the virtual gear (second gear) before change.

The inertia phase has not been started, and therefore there is no change in the turbine speed NT (NT detected when the gear change is started=current NT). Accordingly, the gear-change progress α is calculated as "1" in step S900.

Because the calculated gear-change progress α is "1", the virtual gear ratio is calculated as KGEAR (1) (i.e., the gear ratio of the gear before the gears are changed (second gear)) in S1000.

Accordingly, when the inertial phase has not been started in the gear-change from second gear to third gear, the target engine torque TE is calculated by the expression, drive power F×tire radius/differential gear ratio/virtual gear ratio (gear ratio of second gear)/torque ratio of the torque converter 200.

[When inertia phase has been started in gear-change from second gear to third gear]

Because it is determined in S100 that the gears are being changed, and it is also determined in S300 that the inertia phase has been started (the inertia phase after time T(1) in FIG. 4), the virtual gear is set, in S500, to third gear which is the gear after the gears are changed. Further, because it is determined in S600 that the gears are being changed, the gear before the gears are changed is set, in S800, to the virtual gear (third gear) before change.

The inertia phase has been started, and turbine speed NT is changing (the turbine speed NT is gradually decreasing from the turbine speed NT detected when the gear-change is started to the current turbine speed NT). Accordingly, the gear-change progress a is calculated as a value in a range from 1 to 0 in step S900. As the gear-change proceeds in the inertia phase, the turbine speed NT decreases because upshifting is being performed. Accordingly, the gear-change progress a decreases from 1 to 0.

Because the gear-change progress α is a value in the range from 1 to 0, the virtual gear ratio is calculated by the expression, KGEAR (1) (=the gear ratio of the gear before the gears are changed (second gear)×α+KGEAR (2) (=the gear ratio of the virtual gear (third gear))×(1−α). Thus, the gear ratio in the inertia phase is set, in S1000, to the virtual gear ratio calculated by interpolating a value between the gear ratio of second gear and the gear ratio of third gear.

Accordingly, when the inertia phase has been started in the gear-change from second gear to third gear, the target engine torque TE is calculated by the expression, drive power F×tire radius/differential gear ratio/virtual gear ratio (the gear ratio calculated based on the gear ratios of second gear and third gear and the gear-change progress α)/torque ratio of the torque converter 200.

When the gear-change further proceeds in the inertia phase and then the turbine speed NT reaches the synchronous rotational speed of third gear (at time T(2) in FIG. 4), the gear-change from second gear to third gear ends. At this time, the turbine speed NT is equal to the synchronous rotational speed NOGEAR, and therefore, the gear-change progress α is 0.

As described above, when the target engine torque is calculated based on the target drive power, the ECU, which is the control unit according to the embodiment of the invention, causes a change in the engine torque due to the difference in the gear ratio to occur within the inertia phase. Accordingly, the torque to be output from the engine is changed by changing the target engine torque within the inertia phase. Thus, it is possible to absorb shock caused due to changes in the engine torque during the shift control. Further, because the virtual gear ratio is calculated while the gears are being changed (in the inertia phase), the engine torque is changed continuously in the inertia phase (if the target drive power changes continuously). Accordingly, it is possible to change the target engine torque continuously. Thus, shock due to changes in the engine torque are absorbed. Further, in the inertia phase, the virtual gear ratio is changed in accordance with a change in the turbine speed in the inertia phase. That is, a value is interpolated between the gear ratios before and after the gears are changed, using the ratio between the turbine speed NT detected when the inertia phase is started and the target rotational speed (synchronous rotational speed) after the gears are changed. Because the virtual gear ratio during the gear-change is calculated by interpolating a value between the gear ratios before and after the gears are changed, the virtual gear ratio continuously changes. Thus, it is possible to continuously change the gear ratio even when the one-way clutch is idling.

Further, the same conversion expression for converting the target drive power to the target engine torque is used regardless of whether the gears are being changed or the gears are not being changed. Accordingly, the result of coordination made using the unit of drive power and the result of coordination made using the unit of engine torque are the same regardless of whether the gears are being changed or the gears are not being changed. Therefore, restrictions on the unit used to make coordination are relaxed.

[Skip Shifting]

Figure 5:
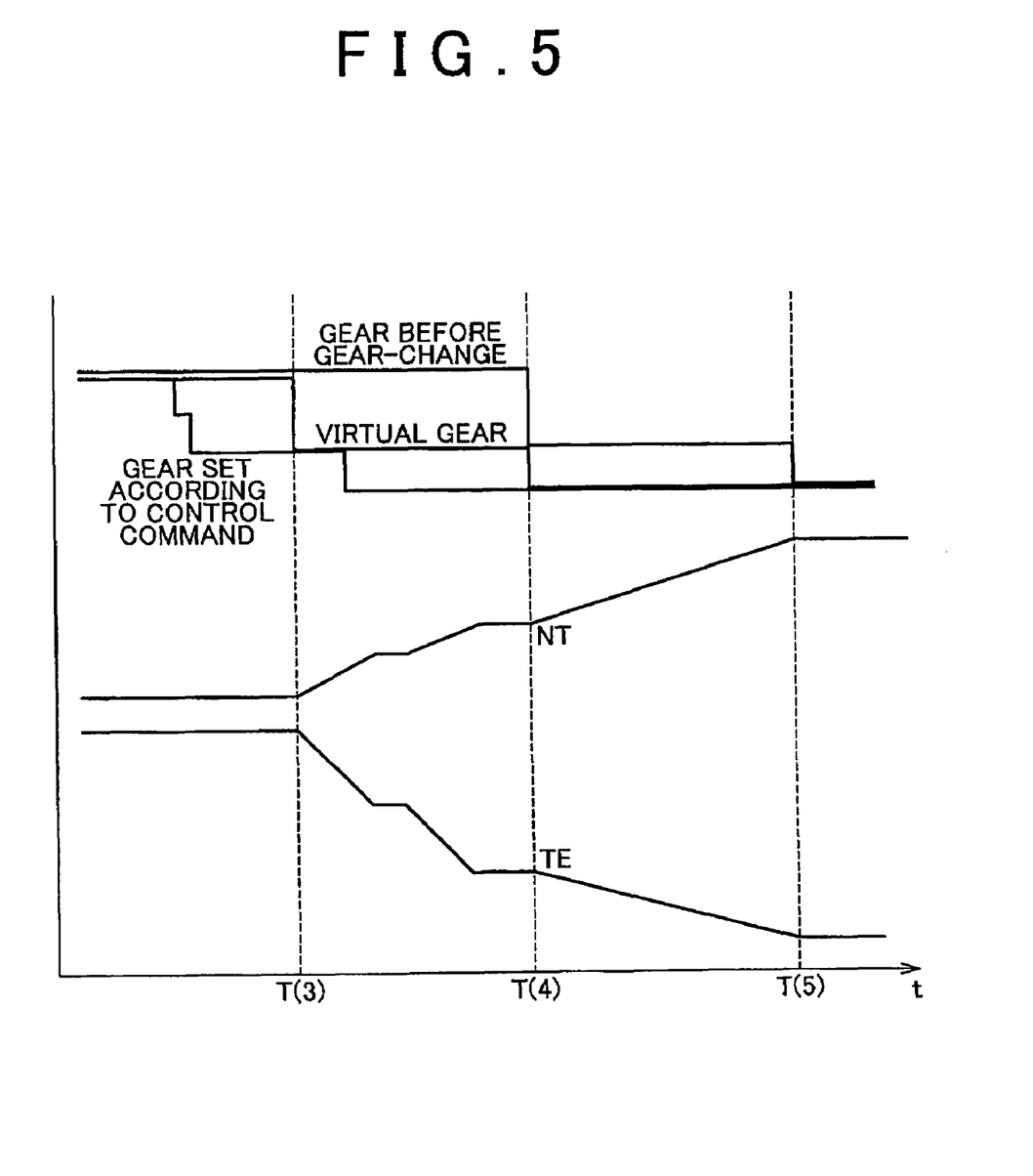
FIG. 5 illustrates the second timing chart showing the state when the routine shown by the flowchart in FIG. 3 is performed.

FIG. 5 is the timing chart showing the state when skip shifting is performed. With reference to FIG. 5, the state where the virtual gear is maintained will be described.

From time T(3) to time T(4), the virtual gear, which is set separately from the gear that is set according to the control command, is maintained at certain gear. In the skip shifting, when the gear-change initially started is proceeding in the inertia phase, where the turbine speed NT changes, (when it is determined in S100 that the gears are being changed, and it is determined in S300 that the inertia phase has been started), the virtual gear is maintained until gear-change secondly started enters the inertia phase.

Because the virtual gear used to calculate the virtual gear ratio is maintained, unnecessary changes in drive power is prevented from occurring phases other than the inertia phase. During the skip shifting, the virtual gear used to calculate the virtual gear ratio is changed each time the inertia phase is started, whereby the virtual gear ratio changes continuously, and, consequently, the target engine torque changes continuously. Thus, it is possible to prevent a sudden change in the torque that occurs when the virtual gear is changed during the inertia phase.

The ECU, which is the control unit according to the embodiment of the invention, calculates the target engine torque based on the virtual gear ratio that changes continuously in the inertia phase, in the vehicle equipped with the stepped automatic transmission. Also, the ECU uses the same conversion expression to convert the target drive power to the target engine torque regardless of whether the gears are being changed or the gears are not being changed. Therefore, it is possible to smoothly change the engine torque, thereby preventing shift shock.

The embodiment disclosed here is merely exemplary, and is not intended to limit the invention in any manner. The scope of the invention is not limited by the specific embodiment described above, but is defined by the claims, and all changes which come within the meaning and range of equivalency of the claims are intended to be embraced therein.

What is claimed is:

1. A control unit for a vehicle equipped with a stepped automatic transmission, comprising:
    a gear-change progress calculation device that calculates progress of gear-change performed by the automatic transmission;
    a virtual gear ratio calculation device that calculates a virtual gear ratio based on the progress of the gear-change, a gear ratio before the gear-change and a gear ratio after the gear-change; and
    a target torque calculation device that calculates a target torque to be output from a drive power source of the vehicle based on the virtual gear ratio.

2. The control unit according to claim 1, further comprising:
    an input shaft rotational speed detection device that detects a rotational speed of an input shaft of the automatic transmission, wherein
    the gear-change progress calculation device calculates the progress of the gear-change based on the detected rotational speed of the input shaft and a synchronous rotational speed after the gear-change.

3. The control unit according to claim 2, wherein the gear-change progress calculation device calculates the progress of the gear-change based on a ratio of a difference between the detected rotational speed of the input shaft and the synchronous rotational speed after the gear-change to a difference between the rotational speed of the input shaft of the automatic transmission before the gear-change and the synchronous rotational speed after the gear-change.

4. The control unit according to claim 1, wherein the gear-change progress calculation device calculates the progress of the gear-change based on recognition that the gear-change starts when an inertia phase is started and ends when the gear-change is completed in the automatic transmission.

5. The control unit for the vehicle according to claim 1, wherein the virtual gear ratio calculation device calculates the virtual gear ratio by following expression:

$$\text{virtual gear ratio} = \text{the gear ratio before the gear-change} \times \text{the progress of the gear-change} + \text{the gear ratio after the gear-change} \times (1 - \text{the progress of the gear-change}).$$

6. A control unit for a vehicle equipped with a stepped automatic transmission, comprising:
    gear-change progress calculation means for calculating progress of gear-change performed by the automatic transmission;
    virtual gear ratio calculation means for calculating a virtual gear ratio based on the progress of the gear-change, a gear ratio before the gear-change and a gear ratio after the gear-change; and
    target torque calculation means for calculating a target torque to be output from a drive power source of the vehicle based on the virtual gear ratio.

7. A control method for a vehicle equipped with a stepped automatic transmission, comprising:
    calculating progress of gear-change performed by the automatic transmission;
    calculating a virtual gear ratio based on the progress of the gear-change, a gear ratio before the gear-change and a gear ratio after the gear-change; and
    calculating a target torque to be output from a drive power source of the vehicle based on the virtual gear ratio.

8. The control method for the vehicle according to claim 7, further comprising:
    detecting a rotational speed of an input shaft of the automatic transmission, wherein
    the progress of the gear-change is calculated based on the detected rotational speed of the input shaft and a synchronous rotational speed after the gear-change.

9. The control method for the vehicle according to claim 8, wherein the progress of the gear-change is calculated based on a ratio of a difference between the detected rotational speed of the input shaft and the synchronous rotational speed after the gear-change to a difference between the rotational speed of the input shaft of the automatic transmission before the gear-change and the synchronous rotational speed after the gear-change.

10. The control method for the vehicle according to claim 7, wherein the virtual gear ratio is calculated by following expression:

$$\text{virtual gear ratio} = \text{the gear ratio before the gear-change} \times \text{the progress of the gear-change} + \text{the gear ratio after the gear-change} \times (1 - \text{the progress of the gear-change}).$$

* * * * *